US012780234B2

(12) United States Patent
Yamazaki

(10) Patent No.: US 12,780,234 B2

(45) Date of Patent: Nov. 3, 2026

(54) DRIVING ASSISTANCE DEVICE, METHOD, AND COMPUTER-READABLE STORAGE MEDIUM

(71) Applicant: HONDA MOTOR CO., LTD., Tokyo (JP)

(72) Inventor: Taku Yamazaki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 111 days.

(21) Appl. No.: 18/896,838

(22) Filed: Sep. 25, 2024

(65) Prior Publication Data

US 2025/0108826 A1 Apr. 3, 2025

(30) Foreign Application Priority Data

Sep. 29, 2023 (JP) ................................ 2023-170827

(51) Int. Cl.

*B60W 50/14* (2020.01)
*H04W 4/46* (2018.01)

(52) U.S. Cl.

CPC .............. *B60W 50/14* (2013.01); *H04W 4/46* (2018.02); *B60W 2050/143* (2013.01); (Continued)

(58) Field of Classification Search

CPC ........... B60W 50/14; B60W 2050/143; B60W 2050/146; B60W 2554/4044; B60W 2554/802; B60W 2556/65; H04W 4/46

See application file for complete search history.

(56) References Cited

U.S. PATENT DOCUMENTS

| | | | |
|---|---|---|---|
| 11,052,910 | B2 | 7/2021 | Honda et al. |
| 11,100,804 | B2 | 8/2021 | Kurehashi |

(Continued)

FOREIGN PATENT DOCUMENTS

| | | |
|---|---|---|
| JP | 2014-154004 A | 8/2014 |
| JP | 2019-061352 A | 4/2019 |

(Continued)

OTHER PUBLICATIONS

Japanese Office Action for Japanese Patent Application No. 2023-170827 mailed on Oct. 3, 2025.

(Continued)

*Primary Examiner* — Rufus C Point

(74) *Attorney, Agent, or Firm* — Thomas Horstemeyer, LLP

(57) ABSTRACT

A driving assistance device mounted on a vehicle capable of communicating with another vehicle, comprising a calculation unit configured to calculate a travel route of the other vehicle based on a result of the communication with the other vehicle, and an arithmetic unit configured to determine whether the self-vehicle interferes with the other vehicle traveling on the calculated travel route, and generate a notification signal for notifying that the self-vehicle interferes with the other vehicle when it is determined that the self-vehicle interferes with the other vehicle, wherein the arithmetic unit is deactivated when a preceding vehicle traveling in a direction equivalent to a direction of the self-vehicle is within a range of a predetermined distance from the self-vehicle.

7 Claims, 11 Drawing Sheets

(52) U.S. Cl.
CPC ................. *B60W 2050/146* (2013.01); *B60W 2554/4044* (2020.02); *B60W 2554/802* (2020.02); *B60W 2556/65* (2020.02)

(56) References Cited

U.S. PATENT DOCUMENTS

| | | | | |
|---|---|---|---|---|
| 11,760,345 | B2 | 9/2023 | Kozono et al. | |
| 2007/0265760 | A1* | 11/2007 | Konhauser ......... | B60K 31/0058 180/170 |
| 2014/0149031 | A1* | 5/2014 | Goudy ................... | G08G 1/161 701/300 |
| 2014/0226015 | A1 | 8/2014 | Takatsudo et al. | |
| 2017/0066445 | A1* | 3/2017 | Habu .................. | B60W 30/165 |
| 2022/0105927 | A1 | 4/2022 | Kozono et al. | |
| 2022/0297687 | A1* | 9/2022 | Yamazaki ......... | B60W 30/0956 |

FOREIGN PATENT DOCUMENTS

| | | | | |
|---|---|---|---|---|
| JP | 2019-159975 | A | 9/2019 | |
| JP | 2022-061482 | A | 4/2022 | |
| JP | 2022-145240 | A | 10/2022 | |
| WO | 2013/042767 | A1 | 3/2013 | |
| WO | WO-2013145274 | A1 * | 10/2013 | ............. G08G 1/163 |

OTHER PUBLICATIONS

Japanese Office Action for Japanese Patent Application No. 2023-170827 mailed on May 9, 2025.

* cited by examiner

DRIVING ASSISTANCE DEVICE, METHOD, AND COMPUTER-READABLE STORAGE MEDIUM

CROSS-REFERENCE TO RELATED APPLICATION(S)

This application claims priority to and the benefit of Japanese Patent Application No. 2023-170827 filed on Sep. 29, 2023, the entire disclosure of which is incorporated herein by reference.

BACKGROUND OF THE INVENTION

Field of the Invention

The present invention mainly relates to an in-vehicle driving assistance device.

Description of the Related Art

In recent years, efforts to provide access to sustainable transportation systems in which people in vulnerable positions are also considered among traffic participants have become active, and research and development on preventive safety technologies have been widely conducted to further improve traffic safety and convenience in order to realize such transportation systems.

Some vehicles implement driving assistance by performing vehicle-to-vehicle communication to communicate with other vehicles (see Japanese Patent Laid-Open No. 2022-61482), and it is generally required to further improve preventive safety technologies that can be used for driving assistance.

SUMMARY OF THE INVENTION

The present invention provides a technology that is advantageous for further improving a preventive safety technology that can be used for driving assistance.

One of the aspects of the present invention provides a driving assistance device mounted on a vehicle capable of communicating with another vehicle, comprising: a calculation unit configured to calculate a travel route of the other vehicle based on a result of the communication with the other vehicle; and an arithmetic unit configured to determine whether the self-vehicle interferes with the other vehicle traveling on the calculated travel route, and generate a notification signal for notifying that the self-vehicle interferes with the other vehicle when it is determined that the self-vehicle interferes with the other vehicle, wherein the arithmetic unit is deactivated when a preceding vehicle traveling in a direction equivalent to a direction of the self-vehicle is within a range of a predetermined distance from the self-vehicle.

Further features of the present invention will become apparent from the following description of exemplary embodiments (with reference to the attached drawings).

DESCRIPTION OF THE EMBODIMENTS

Figure 1:
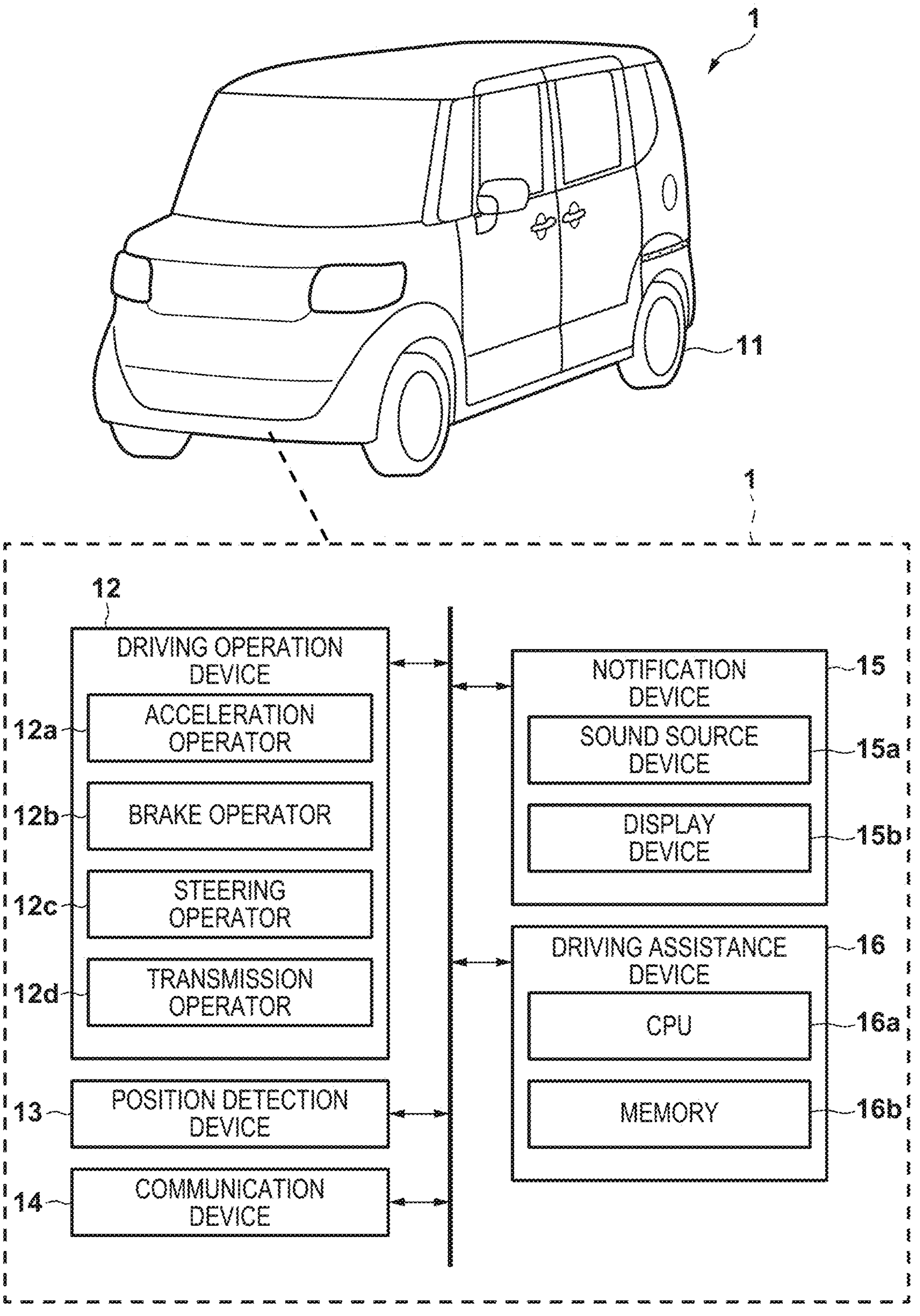
FIG. 1 is a diagram illustrating a system configuration example of a vehicle according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration Example of Vehicle)

FIG. 1 illustrates a vehicle 1 according to an embodiment. The vehicle 1 is a four-wheeled vehicle including two front wheels and two rear wheels as wheels 11, but the number of the wheels 11 is not limited to this example, and the vehicle may be, for example, a two-wheeled vehicle or a three-wheeled vehicle. The vehicle 1 is a boarding type vehicle in the present embodiment, but may be a saddle type vehicle as another embodiment.

In the present embodiment, the vehicle 1 further includes a driving operation device 12, a position detection device 13, a communication device 14, a notification device 15, and a driving assistance device 16.

The driving operation device 12 includes an acceleration operator 12*a*, a brake operator 12*b*, a steering operator 12*c*, and a transmission operator 12*d* and is disposed in the vicinity of a driver seat so that the operators can be accessed by the driver. The acceleration operator 12*a* is configured to be able to receive an operation input for accelerating or maintaining running of the vehicle 1 from the driver, and an accelerator pedal can be used as a typical example of the acceleration operator. The brake operator 12*b* is configured to be able to receive an operation input for decelerating or stopping the vehicle 1 from the driver, and a brake pedal can be used as a typical example of the brake operator. The steering operator 12*c* is configured to be able to receive an operation input for turning the vehicle 1 or changing a traveling direction from the driver, and a steering wheel can be used as a typical example. The transmission operator 12*d* is configured to be able to receive an operation input for changing a gear ratio of a transmission in a power transmission mechanism that transmits power of a power source to the wheel 11 from the driver, and a shift lever can be used as a typical example of the transmission operator. Other known configurations such as button switches may be adopted for the operators 12*a* to 12*d*.

The position detection device 13 is a sensor capable of detecting or identifying positional information of the vehicle 1. Typically, a Global Positioning System (GPS) sensor can be used. The position detection device 13 detects a position of the vehicle 1 on absolute coordinates, but may detect a relative position of the vehicle 1 to a reference position.

The communication device 14 is configured to be able to exchange signals with other vehicles through so-called vehicle-to-vehicle communication (in order to distinguish the vehicle 1 from other vehicles, the vehicle 1 may be called a "self-vehicle 1" in the following description). Details of the communication content will be described below.

The notification device 15 includes a sound source device 15*a* and a display device 15*b*. The sound source device 15*a* is configured to be able to generate a predetermined notification sound for the driver, and a known device such as a speaker that allows the driver to recognize the notification sound audibly may be used. The display device 15*b* is configured to be able to display image information for the driver, and a known device such as a liquid crystal display that allows the driver to recognize the image information visually may be used. Details of the notification content will be described below.

The driving assistance device 16 includes a central processing unit (CPU) 16*a* and memory 16*b*. The CPU 16*a* can realize a driving assistance function to be described below by executing a predetermined program while loading the program on the memory 16*b*. The driving assistance device 16 may be configured with an application specific integrated circuit (ASIC). That is, the driving assistance function may be realized by either hardware or software, may be incorporated with a circuit in a semiconductor device, or may be performed based on an instruction of a computer by a processor with a memory.

(Example of Driving Assistance Function)

The driving assistance performed by the driving assistance device 16 involves directly or indirectly assisting the driver with driving. In the present embodiment, the driving assistance device 16 can perform driving assistance, for example, by performing interference prediction with another vehicle based on a communication result by the communication device 14, generating map information as necessary, and performing predetermined notification by the notification device 15.

Interference Prediction Based on Communication With Oncoming Vehicle

Figure 2A:
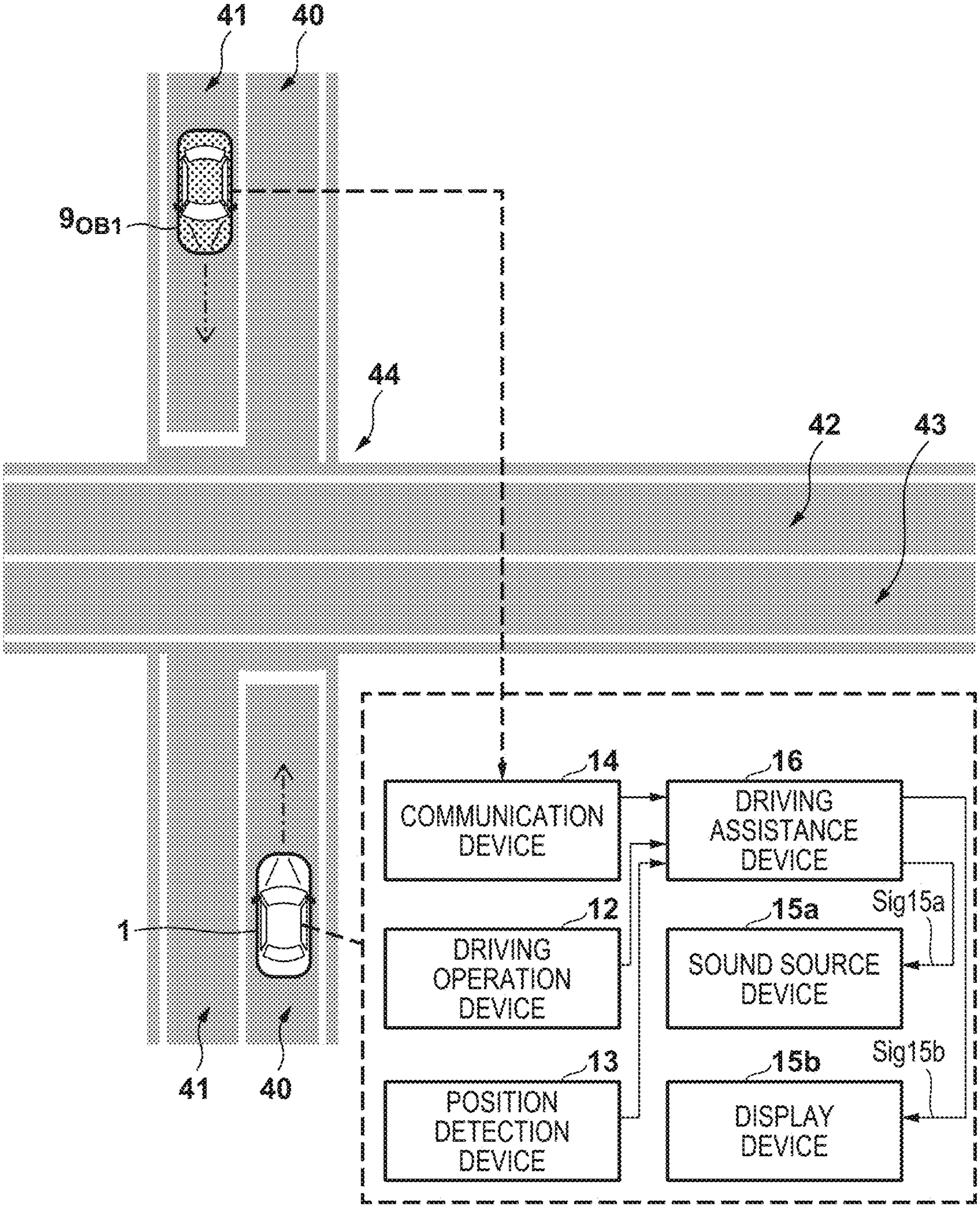
FIG. 2A is a diagram illustrating a type of driving assistance.

FIG. 2A illustrates a mode of interference prediction with an oncoming vehicle $\mathbf{9}_{OB1}$ as an example of another vehicle. A lane in which the self-vehicle 1 travels is called a self-vehicle lane 40, and the oncoming vehicle $\mathbf{9}_{OB1}$ is traveling in an opposite lane 41 in which traveling in a direction opposite to that of the lane 40 is permitted. In the drawing, the lanes 42 and 43 intersect the lanes 40 and 41, and a place where the lanes intersect each other is indicated as an intersection 44.

In this example, it is assumed that the lane 41 is located on the left side of the lane 40, but a positional relationship therebetween may be opposite depending on a country or a district (the same applies to the lanes 42 and 43).

In the self-vehicle 1, the communication device 14 acquires travel information from the oncoming vehicle $\mathbf{9}_{OB1}$, the driving assistance device 16 performs predetermined arithmetic processing based on the travel information, and, for example, a travel route of the oncoming vehicle $\mathbf{9}_{OB1}$ is calculated. As examples of the travel information of the oncoming vehicle $\mathbf{9}_{OB1}$, information indicating a position, a vehicle speed, and a steering angle of the oncoming vehicle $\mathbf{9}_{OB1}$ is typically exemplified, but information indicating an accelerator opening, presence or absence of an input to a direction indicator, and the like may be further included. Alternatively, some or all of the information indicating the travel route itself of the oncoming vehicle $\mathbf{9}_{OB1}$ that can be identified by the oncoming vehicle $\mathbf{9}_{OB1}$ may be acquired by the communication device 14.

The driving assistance device 16 further receives positional information of the self-vehicle 1 from the position detection device 13, receives information indicating content of an operation input to the driving operation device 12 by the driver from the driving operation device 12, and calculates a travel route of the self-vehicle 1 based on the received information.

The driving assistance device 16 performs interference prediction with the oncoming vehicle $\mathbf{9}_{OB1}$ based on the travel route of the oncoming vehicle $\mathbf{9}_{OB1}$ and the travel route of the self-vehicle 1 acquired in this manner. The prediction is performed based on whether a timing at which the self-vehicle 1 interferes with the oncoming vehicle $\mathbf{9}_{OB1}$ is within a predetermined time from a current timing by calculating the timing. The prediction can be performed based on, for example, whether a time to collision (TTC) which is a time until the vehicles come in contact with each other when speeds of the vehicles are maintained is less than a reference value. As another example, the prediction may be performed based on another known arithmetic model.

In the present embodiment, it is assumed that it is determined that the self-vehicle 1 interferes with the oncoming vehicle $\mathbf{9}_{OB1}$ when the TTC of the self-vehicle 1 and the oncoming vehicle $\mathbf{9}_{OB1}$ is less than the reference value. When it is determined that the self-vehicle 1 interferes with the oncoming vehicle $\mathbf{9}_{OB1}$, the driving assistance device 16 generates a signal indicating that there is a possibility of the interference and outputs the signal to the notification device 15 as a notification signal. The notification signal here includes a sound source signal Sig15*a* for notification by the sound source device 15*a* and an image signal Sig15*b* for notification by the display device 15*b*. The sound source device 15*a* generates a predetermined sound based on the sound source signal Sig15*a*, and the display device 15*b* outputs a predetermined image based on the image signal Sig15*b*. Accordingly, the driver can be allowed to recognize the possibility of the interference.

The above-described interference prediction is mainly performed through the arithmetic processing of the CPU 16*a* of the driving assistance device 16, and it is assumed that it is determined, identified, or calculated whether there is the possibility, regardless of the magnitude thereof. Accordingly, the above-described prediction may be rephrased as determination, identification, or calculation (the same applies to other predictions described below).

Generation of Map Information Based on Communication With Oncoming Vehicle

When the self-vehicle 1 does not have map data (for example, when the map data is not stored in the memory 16*b* of the driving assistance device 16 or when no map data is stored in another storage device), other information to be substituted for the map data may be generated and registered in association with the interference prediction with the oncoming vehicle $\mathbf{9}_{OB1}$. The other information that can be generated is expressed as generated map information in the following description.

The generated map information is mainly generated as information indicating a position of the intersection 44, and the position of the intersection 44 is associated with an intersection of another vehicle traveling trajectory that is a trajectory passed by the oncoming vehicle $9_{OB1}$ and a self-vehicle traveling trajectory that is a trajectory passed subsequently by the self-vehicle 1.

Figure 2B:
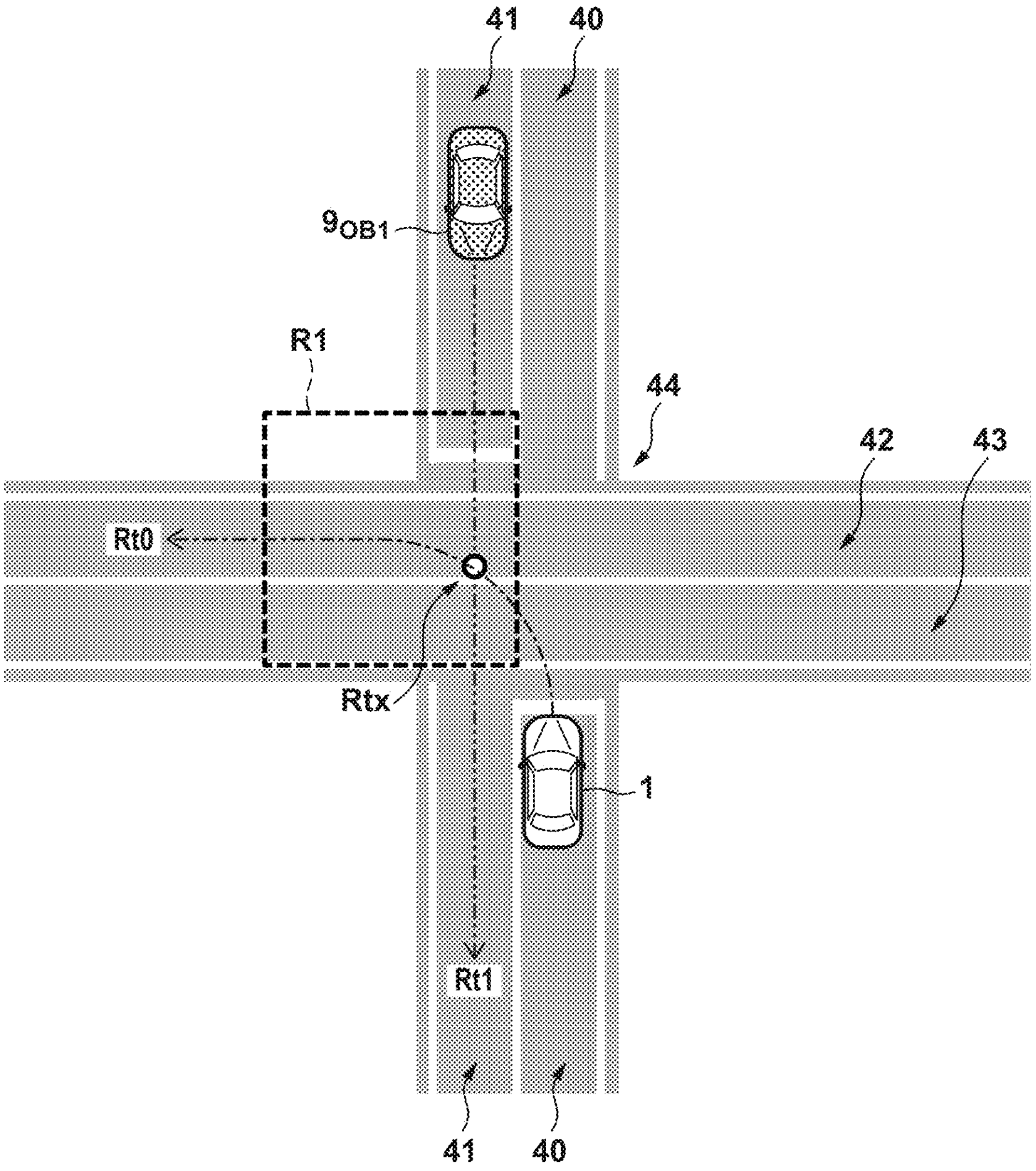
FIG. 2B is a diagram illustrating a type of driving assistance.

FIG. 2B illustrates, as an example, a mode in which the self-vehicle 1 starts and turns left after the oncoming vehicle $9_{OB1}$ passes by the lateral side of the self-vehicle 1. When traveling of the self-vehicle 1 is inhibited (for example, when the self-vehicle 1 is substantially stopped or when the self-vehicle 1 can be quickly stopped (for example, when the speed is 20 [km/h] or less)), the driving assistance device 16 sets a setting region R1 on the lateral front side of the self-vehicle 1. The setting region R1 is set to a predetermined relative position based on the positional information of the self-vehicle 1 acquired by the position detection device 13 and, for example, may be set to a position at a predetermined angle and a predetermined distance from the vehicle body of the self-vehicle 1. When inhibition of the traveling of the self-vehicle 1 is released, the setting region R1 is also released. When the traveling of the self-vehicle 1 is inhibited again, the setting region R1 can be set again to a corresponding position at that time.

The setting region R1 is fixed when the oncoming vehicle $9_{OB1}$ passes through the setting region R1. The fixed setting region R1 is maintained even when the inhibition of the traveling of the self-vehicle 1 is released after the oncoming vehicle $9_{OB1}$ passes. Thereafter, when the self-vehicle 1 turns left and passes through the fixed setting region R1, an intersection RtX of another vehicle traveling trajectory Rt1 which is the trajectory of the oncoming vehicle $9_{OB1}$ and a self-vehicle traveling trajectory Rt0 which is the trajectory of the self-vehicle 1 is exhibited. The positional information of the intersection RtX can be stored and registered in the memory 16*b* as the generated map information indicating the position of the intersection 44.

The fixed setting region R1 can be released in response to the registration of the generated map information and/or can be released in response to separation of the self-vehicle 1 from the setting region R1 by a reference or more.

The driving assistance device 16 can arbitrarily refer to the generated map information acquired in this manner. Accordingly, even when the self-vehicle 1 does not have map data, the position of the intersection 44 can be identified and the above-described notification signal can be generated as necessary to alert the driver. The generated map information may be expressed as intersection positional information. When the inhibition of the traveling of the self-vehicle 1 is canceled even during such calculation processing, the interference prediction with the oncoming vehicle $9_{OB1}$ is appropriately performed as described with reference to FIG. 2A.

Interference Prediction Based on Communication With Front Crossing Vehicle

Figure 3A:
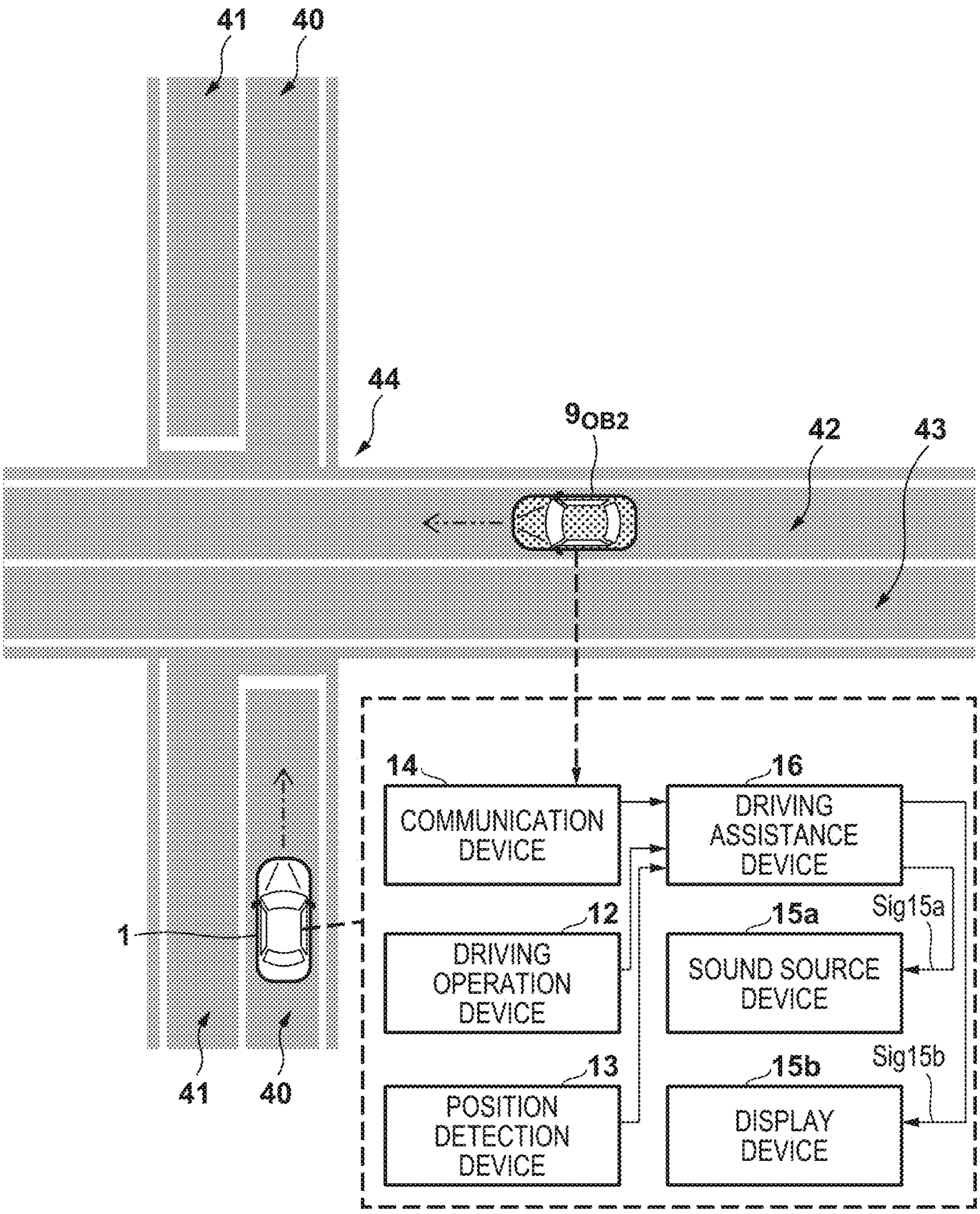
FIG. 3A is a diagram illustrating a type of driving assistance.

FIG. 3A illustrates a mode of interference prediction with a front crossing vehicle $9_{OB2}$ as another example of another vehicle. It is assumed that the front crossing vehicle $9_{OB2}$ is traveling in the lane 42. In this example, the interference prediction can be performed similarly to the example of FIG. 2A. That is, the driving assistance device 16 calculates the travel route of the front crossing vehicle $9_{OB2}$ based on the travel information of the front crossing vehicle $9_{OB2}$ acquired by the communication device 14, and calculates the travel route of the self-vehicle 1 based on the acquired information from the position detection device 13 and the driving operation device 12.

The driving assistance device 16 predicts interference with the front crossing vehicle $9_{OB2}$ based on the travel route of the front crossing vehicle $9_{OB2}$ and the travel route of the self-vehicle 1 acquired in this manner. When the TTC of the self-vehicle 1 and the front crossing vehicle $9_{OB2}$ is less than the reference value, it is determined that the self-vehicle 1 interferes with the front crossing vehicle $9_{OB2}$, and the driving assistance device 16 outputs the above-described notification signal to the notification device 15. Accordingly, the driver can be allowed to recognize the possibility of the interference.

Figure 3B:
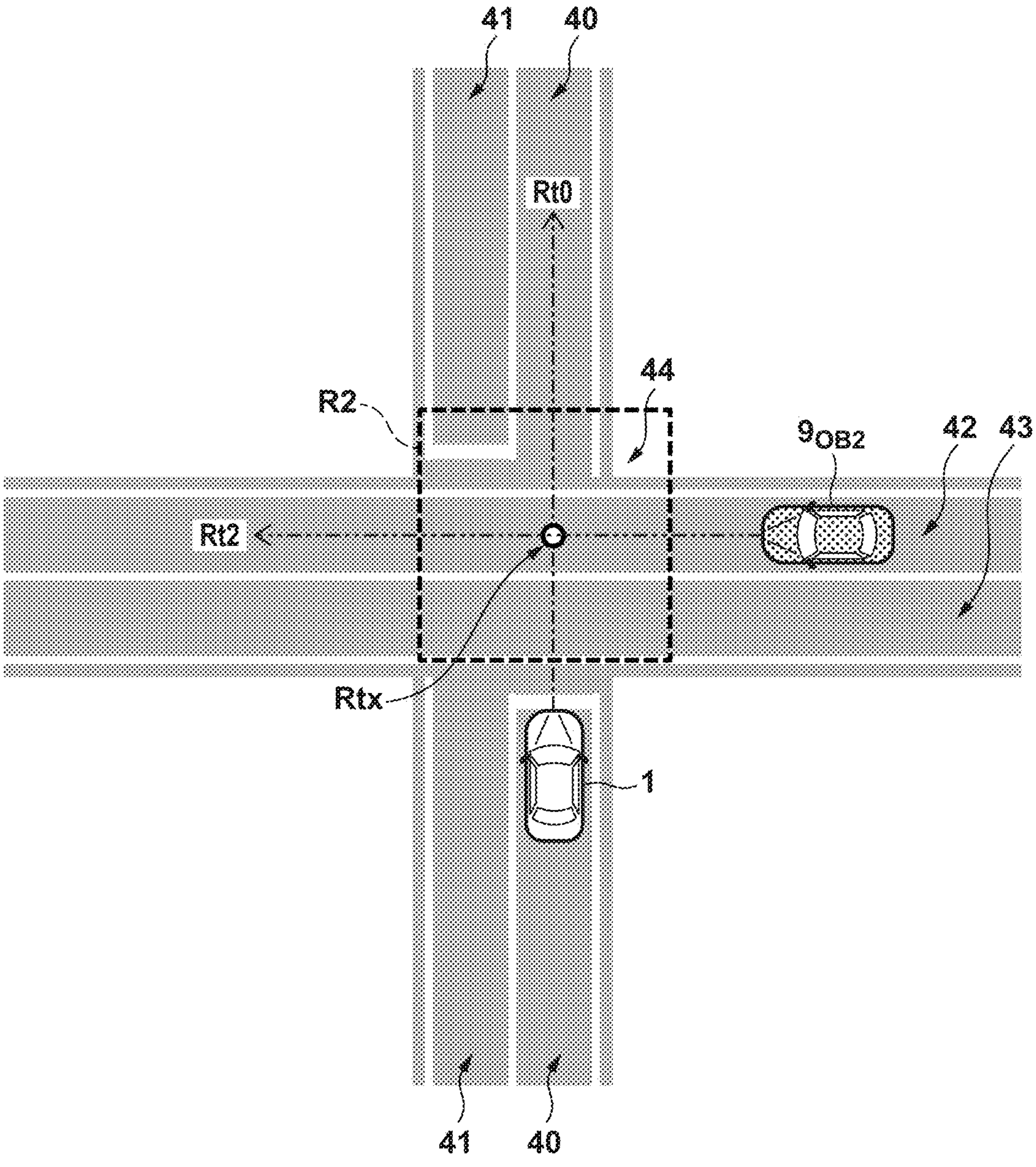
FIG. 3B is a diagram illustrating a type of driving assistance.

Generation of Map Information Based on Communication With Front Crossing Vehicle FIG. 3B illustrates, as an example, a mode in which the self-vehicle 1 starts and travels straight after the front crossing vehicle $9_{OB2}$ passes in front of the self-vehicle 1. When the traveling of the self-vehicle 1 is inhibited, the driving assistance device 16 sets the setting region R2 in front of the self-vehicle 1. The setting region R2 is set independently of the setting region R1. Similarly to the setting region R1, the setting region R2 is also released when the inhibition of the traveling of the self-vehicle 1 is released. The setting region R2 can be set again to a corresponding position at that time at which the traveling of the self-vehicle 1 is inhibited again.

The setting region R2 is fixed when the front crossing vehicle $9_{OB2}$ passes through the setting region R2, and the fixed setting region R2 is maintained even when the inhibition of the traveling of the self-vehicle 1 is released after the front crossing vehicle $9_{OB2}$ passes. Thereafter, when the self-vehicle 1 travels straight and passes through the fixed setting region R2, the intersection RtX of the other vehicle traveling trajectory Rt2 which is the trajectory of the front crossing vehicle $9_{OB2}$ and the self-vehicle traveling trajectory Rt0 which is the trajectory of the self-vehicle 1 is exhibited. The positional information of the intersection RtX can be stored and registered in the memory 16*b* as the generated map information indicating the position of the intersection 44.

The fixed setting region R2 can be released in response to the registration of the generated map information, and/or can be released in response to separation of the self-vehicle 1 from the setting region R2 by the reference or more.

The driving assistance device 16 can generate the above-described notification signal based on the generated map information acquired in this manner to alert the driver. When the inhibition of the traveling of the self-vehicle 1 is canceled even during such calculation processing, the interference prediction with the front crossing vehicle $9_{OB2}$ is appropriately performed, as described with reference to FIG. 3A.

Some driving assistance described above may be performed regardless of presence or absence of a traffic light at the intersection 44, but may be particularly advantageous for improving convenience when there is no traffic light.

(Inhibition of Unnecessary Driving Assistance)

Some or all of the driving assistance described above may be unnecessary depending on a situation. In this case, the driving assistance can be rather bothersome to the driver. Therefore, it is conceivable that some or all of the driving assistance is inhibited. On the other hand, in order to realize an appropriate road traffic environment such as avoidance of confusion for other vehicles $9_{OB1}/9_{OB2}$, it is also said that the inhibition of the driving assistance should be limited to partial inhibition.

Hereinafter, control in which driving assistance can be realized appropriately while considering several situations will be described.

First Example

Figure 4A:
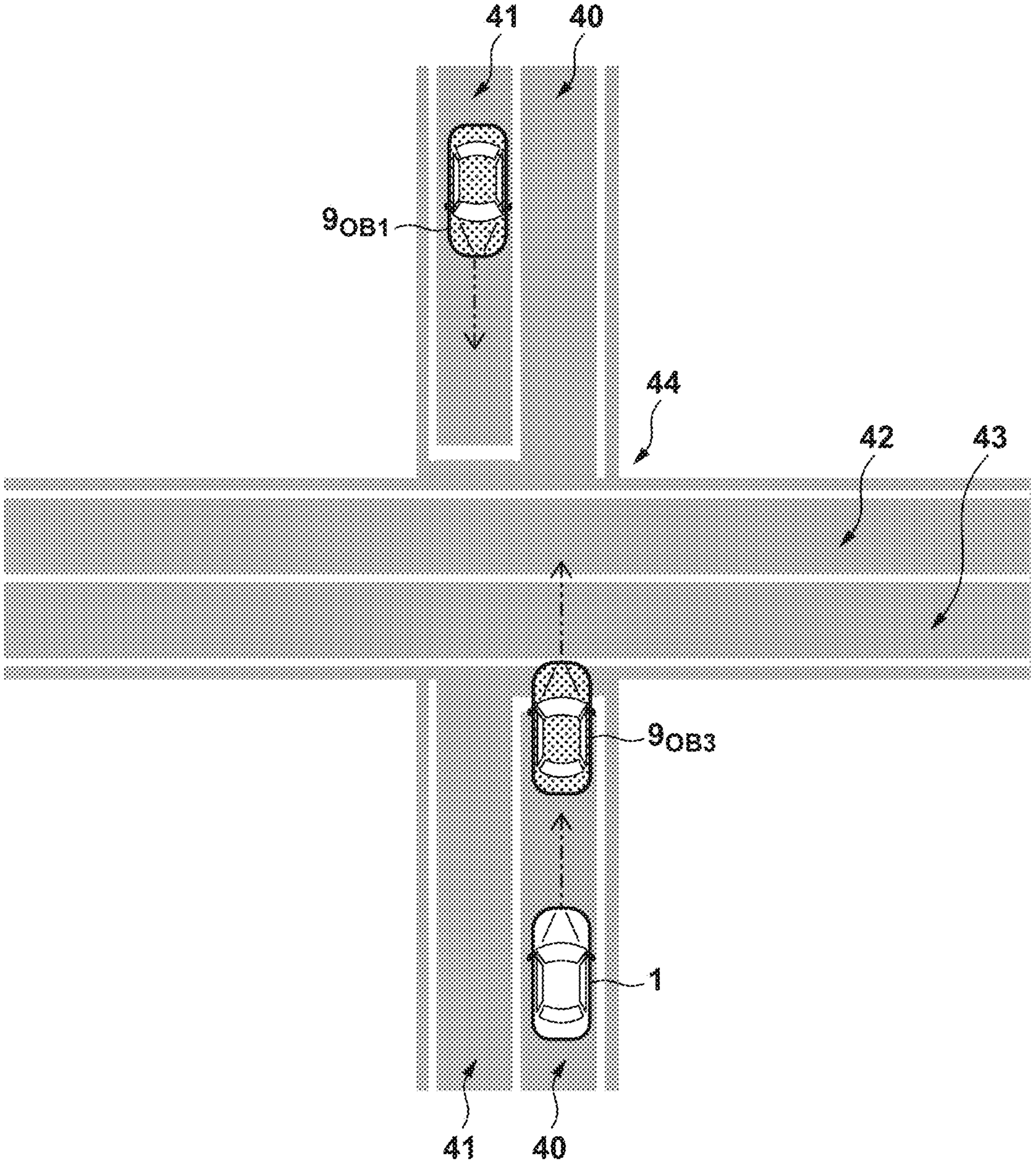
FIG. 4A is a diagram illustrating a type of driving assistance.

FIG. 4A illustrates, as a first example, a mode of a case where the oncoming vehicle $9_{OB1}$ is traveling in the lane 41 and a preceding vehicle $9_{OB3}$ traveling in the same direction as the self-vehicle 1 is located in front of the self-vehicle 1 in the lane 40, similarly to FIG. 2A. Here, it is assumed that there is the preceding vehicle $9_{OB3}$ within a range of a predetermined distance from the self-vehicle 1, and it is generally required to maintain a large inter-vehicle distance as the vehicle speed increases. Therefore, the predetermined distance may be set based on the vehicle speed of the self-vehicle 1.

In the case of this example, the preceding vehicle $9_{OB3}$ is located between the self-vehicle 1 and the oncoming vehicle $9_{OB1}$. Therefore, direct interference between the self-vehicle 1 and the oncoming vehicle $9_{OB1}$ is less likely to occur, and it is also said that an object to which the driver pays attention is rather the preceding vehicle $9_{OB3}$.

In this case, since the notification described with reference to the example of FIG. 2A may unnecessarily alert the driver, the generation of the above-described notification signal is inhibited. The inhibition of the generation of the notification signal includes partial inhibition, that is, the generation of the sound source signal Sig15*a* between the sound source signal Sig15*a* and the image signal Sig15*b* may be inhibited, and the generation of the image signal Sig15*b* may be performed. As another example, in this case, execution of the interference prediction itself may be inhibited. In that case, the generation of both the sound source signal Sig15*a* and the image signal Sig15*b* is inhibited.

Second Example

Figure 4B:
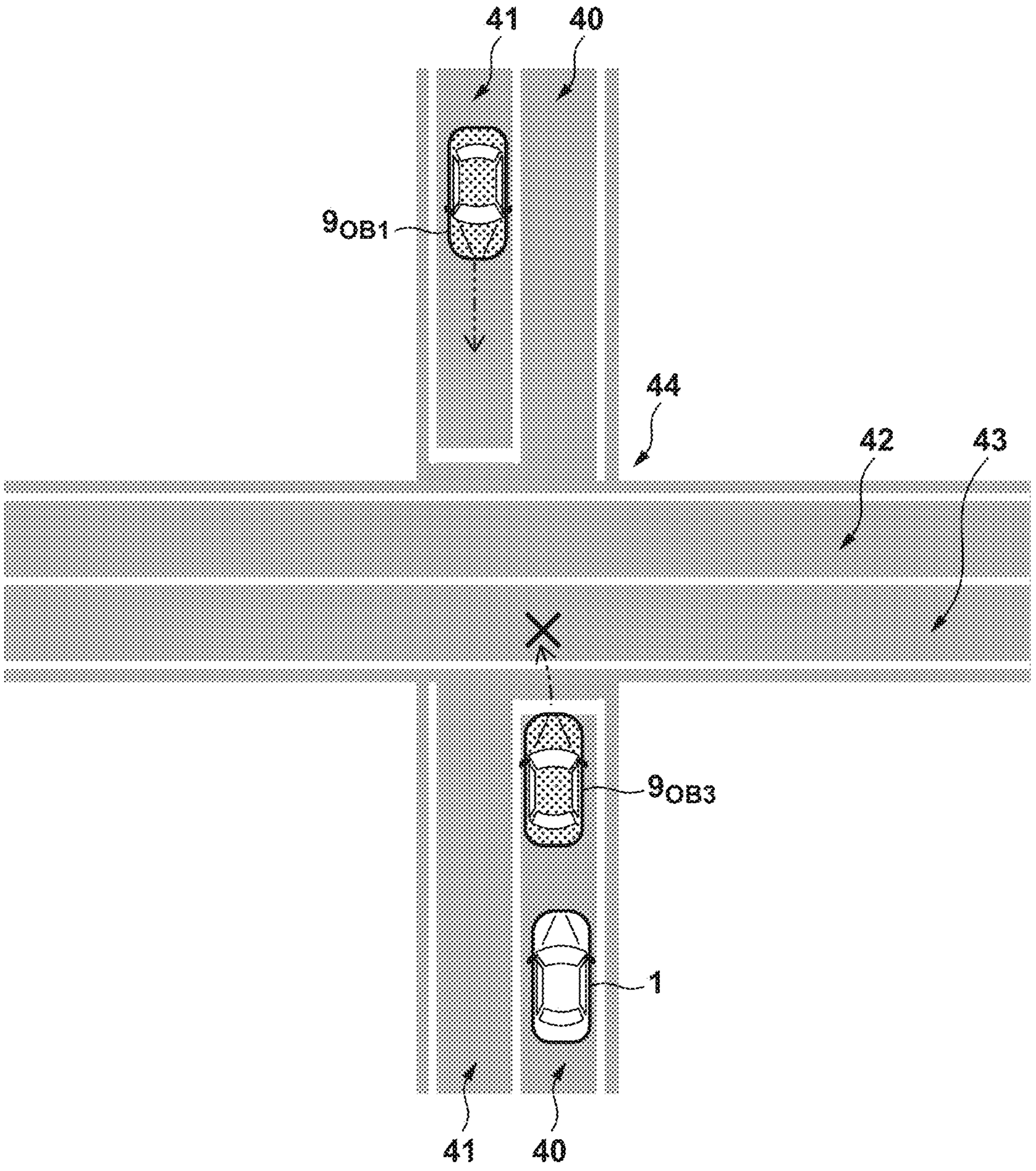
FIG. 4B is a diagram illustrating a type of driving assistance.

FIG. 4B illustrates, as a second example, a mode of a case where the oncoming vehicle $9_{OB1}$ is traveling in the lane 41 and the preceding vehicle $9_{OB3}$ is located in front of the self-vehicle 1, similarly to FIG. 2B.

In the case of this example, similarly to the self-vehicle 1, the preceding vehicle $9_{OB3}$ is in a state in which traveling is inhibited so that the preceding vehicle $9_{OB3}$ starts and turns left after the oncoming vehicle $9_{OB1}$ passes. Therefore, direct interference between the self-vehicle 1 and the oncoming vehicle $9_{OB1}$ is less likely to occur, and it is also said that an object to which the driver pays attention is rather the preceding vehicle $9_{OB3}$.

In this case, since the notification described with reference to the example of FIG. 2B may unnecessarily alert the driver, the generation of the notification signal or execution of the interference prediction described above may be inhibited.

Third Example

Figure 5A:
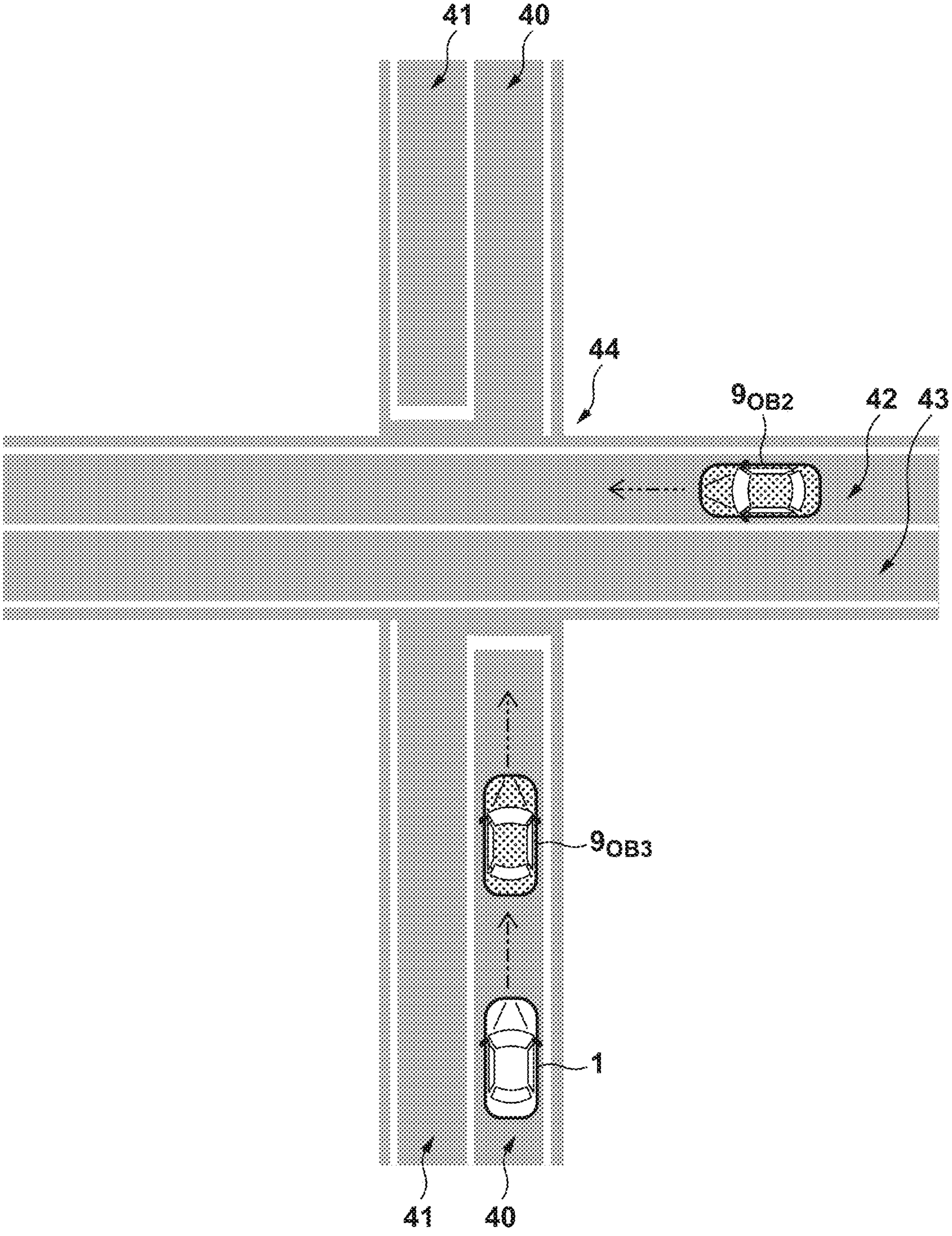
FIG. 5A is a diagram illustrating a type of driving assistance.

FIG. 5A illustrates, as a third example, a mode of a case where the front crossing vehicle $9_{OB2}$ is traveling on the lane 42 and the preceding vehicle $9_{OB3}$ is located in front of the self-vehicle 1, similarly to FIG. 3A.

In this example, the preceding vehicle $9_{OB3}$ is located between the self-vehicle 1 and the front crossing vehicle $9_{OB2}$. Therefore, direct interference between the self-vehicle 1 and the front crossing vehicle $9_{OB2}$ is less likely to occur, and it is also said that an object to which the driver pays attention is rather the preceding vehicle $9_{OB3}$.

In this case, since the notification described with reference to the example of FIG. 3A may unnecessarily alert the driver, the generation of the notification signal or execution of the interference prediction described above may be inhibited.

Fourth Example

Figure 5B:
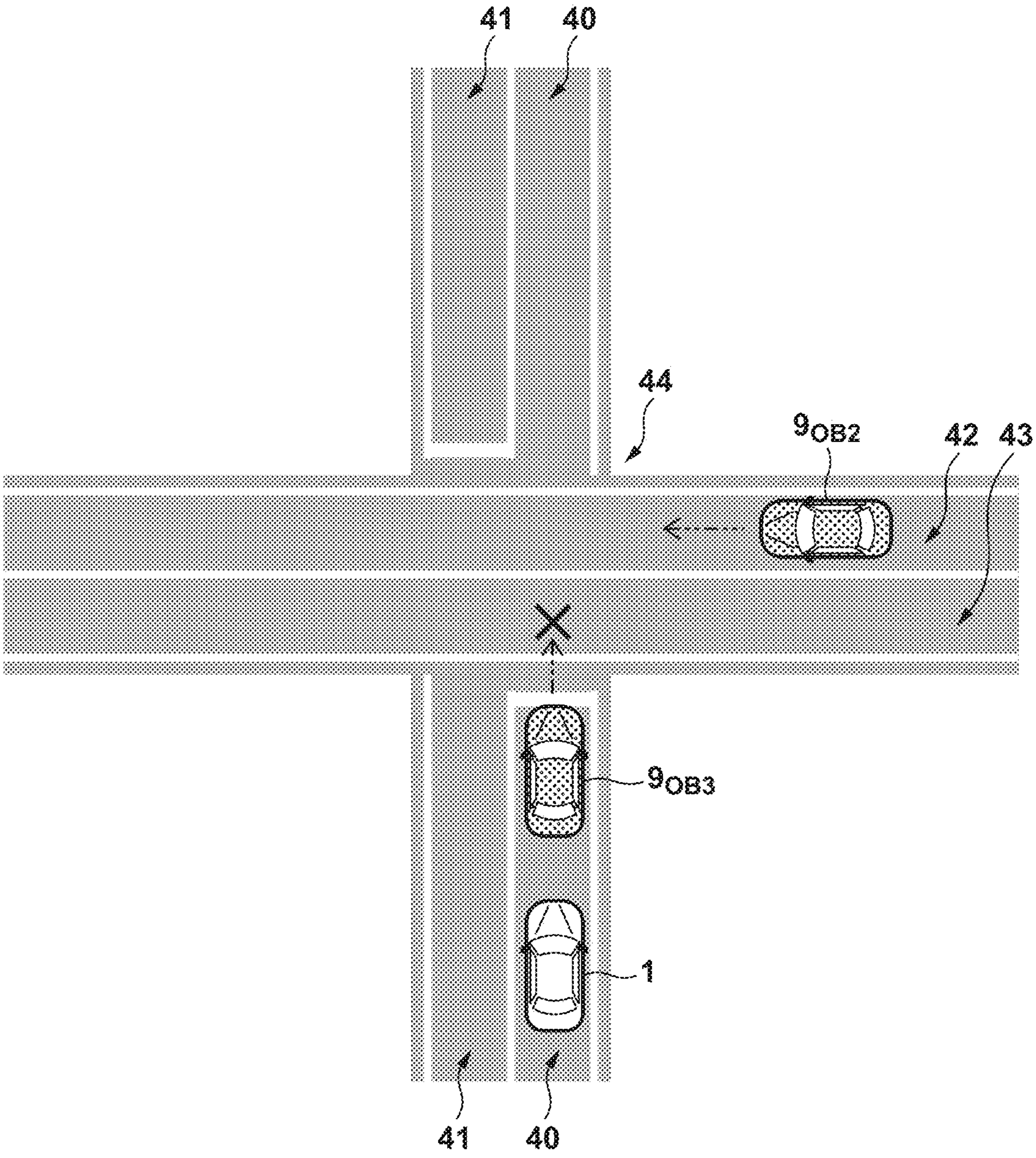
FIG. 5B is a diagram illustrating a type of driving assistance.

FIG. 5B illustrates, as a fourth example, a mode of a case where the front crossing vehicle $9_{OB2}$ is traveling on the lane 42 and the preceding vehicle $9_{OB3}$ is located in front of the self-vehicle 1, similarly to FIG. 3B.

In this example, similarly to the self-vehicle 1, the preceding vehicle $9_{OB3}$ is in a state in which traveling is inhibited until the preceding vehicle $9_{OB3}$ starts and travels straight after the front crossing vehicle $9_{OB2}$ passes. Therefore, direct interference between the self-vehicle 1 and the front crossing vehicle $9_{OB2}$ is less likely to occur, and it is also said that an object to which the driver pays attention is rather the preceding vehicle $9_{OB3}$.

In this case, since the notification described with reference to the example of FIG. 3B may unnecessarily alert the driver, the generation of the notification signal or execution of the interference prediction described above may be inhibited.

(Detection or Determination of Preceding Vehicle)

In the first to fourth examples described above, it is also conceivable that the self-vehicle 1 and the preceding vehicle $9_{OB3}$ have different travel routes. In this case, the driver is still required to pay attention to the interference between the self-vehicle 1 and the other vehicle (the oncoming vehicle $9_{OB1}$ and/or the front crossing vehicle $9_{OB2}$), and thus the notification signal is preferably generated.

The travel route of the preceding vehicle $9_{OB3}$ may be calculated by causing the communication device 14 to acquire travel information of the preceding vehicle $9_{OB3}$, or some or all of information indicating the travel route of the preceding vehicle $9_{OB3}$ itself that can be identified by the preceding vehicle $9_{OB3}$ may be acquired by the communication device 14.

In the following example, it is assumed that it is determined whether the travel routes of the self-vehicle 1 and the preceding vehicle $9_{OB3}$ are different from each other based on the travel route of the self-vehicle 1 and a relative position of the preceding vehicle $9_{OB3}$ to the travel route.

Figure 6A:
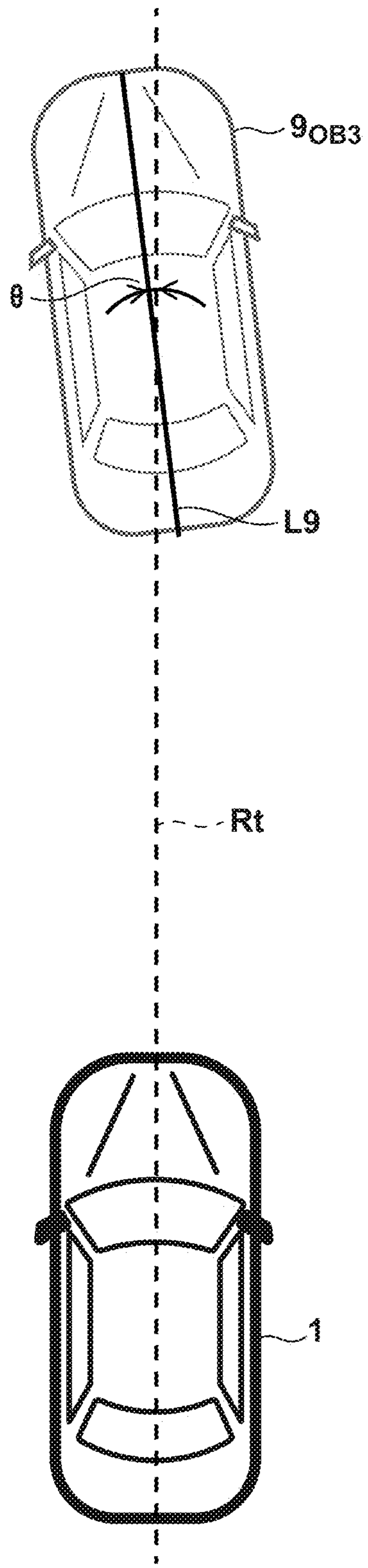
FIG. 6A is a diagram illustrating a type of driving assistance.

FIG. 6A illustrates a state in which a vehicle body reference line L9 of the preceding vehicle $9_{OB3}$ overlaps or intersects the travel route Rt of the self-vehicle 1 at a certain timing. Here, to facilitate understanding, the travel route Rt is assumed to be straight.

In this case, whether the travel routes of the self-vehicle 1 and the preceding vehicle $9_{OB3}$ are different from each other may be determined based on whether an angle $\theta$ formed by the travel route Rt of the self-vehicle 1 and the vehicle body reference line L9 of the preceding vehicle $9_{OB3}$ satisfies a reference. For example, when the angle $\theta$ is greater than a reference angle $\theta_{REF}$ (when $\theta>\theta_{REF}$), it can be determined that the self-vehicle 1 and the preceding vehicle $9_{OB3}$ have different travel routes. When the angle $\theta$ is less than the reference angle $\theta_{REF}$ (when $\theta<\theta_{REF}$), it can be determined that the travel routes are the same. Either a determination result may be obtained when the angle $\theta$ is equal to the reference angle $\theta_{REF}$ (when $\theta=\theta_{REF}$).

The vehicle body reference line L9 of the preceding vehicle $9_{OB3}$ typically corresponds to the center line of the vehicle body of the preceding vehicle $9_{OB3}$, and can be acquired from the preceding vehicle $9_{OB3}$ by the communication device 14.

Figure 6B:
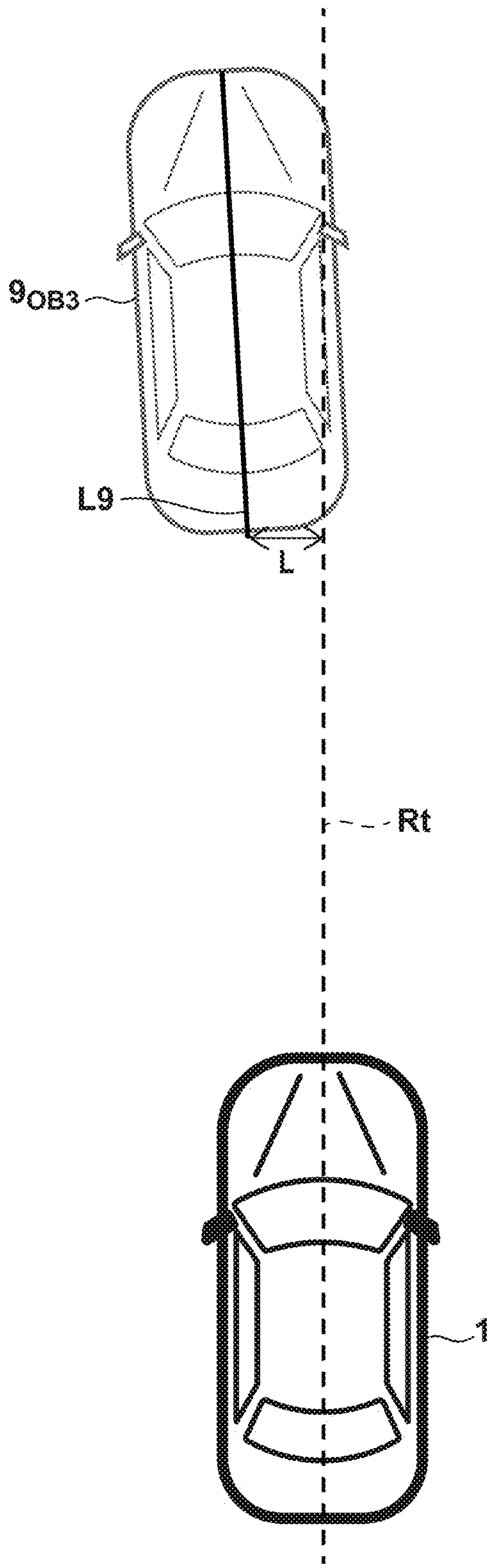
FIG. 6B is a diagram illustrating a type of driving assistance.

FIG. 6B illustrates a state in which the travel route Rt of the self-vehicle 1 does not overlap the vehicle body reference line L9 of the preceding vehicle $9_{OB3}$.

In this case, based on whether the shortest distance L between the travel route Rt of the self-vehicle 1 and the vehicle body reference line L9 of the preceding vehicle $9_{OB3}$ satisfies the reference, it may be determined whether the travel routes of the self-vehicle 1 and the preceding vehicle $9_{OB3}$ are different from each other. For example, when the distance L is greater than the reference length $L_{REF}$ (when $L>L_{REF}$), it can be determined that the self-vehicle 1 and the preceding vehicle $\mathbf{9}_{OB3}$ have different travel routes. When the distance L is less than the reference length $L_{REF}$ (when $L<L_{REF}$), it can be determined that the travel routes are the same. Any determination result may be obtained when the distance Lis equal to the reference length $L_{REF}$ (when $L=L_{REF}$).

The reference length $L_{REF}$ may be a fixed value such as 1 meter, for example, but may be a variation value based on a lane width (for example, a value determined within a range of 0.1 to 1 times the lane width). In this case, the lane width may be detected by a detection device (in-vehicle camera or the like) to be described below. At that time, the magnification may be changed according to the width of a shoulder.

As another example, the above-described determination may be performed by adopting both the determination references (the reference angle $\theta_{REF}$ and the reference length $L_{REF}$) illustrated in the examples of FIGS. 6A and 6B and comparing and considering the determination results.

Actually, the travel route Rt is not straight and may be curved depending on a steering angle of the self-vehicle 1. In this case, a part of the curved travel route Rt corresponding to the vehicle body reference line L9 of the preceding vehicle $\mathbf{9}_{OB3}$ can be approximated to a straight line by arithmetic processing such as averaging processing. It may be determined whether the self-vehicle 1 and the preceding vehicle $\mathbf{9}_{OB3}$ have different travel routes, using the approximate straight line generated in this manner.

(Control Content of Driving Assistance)

Figure 7:
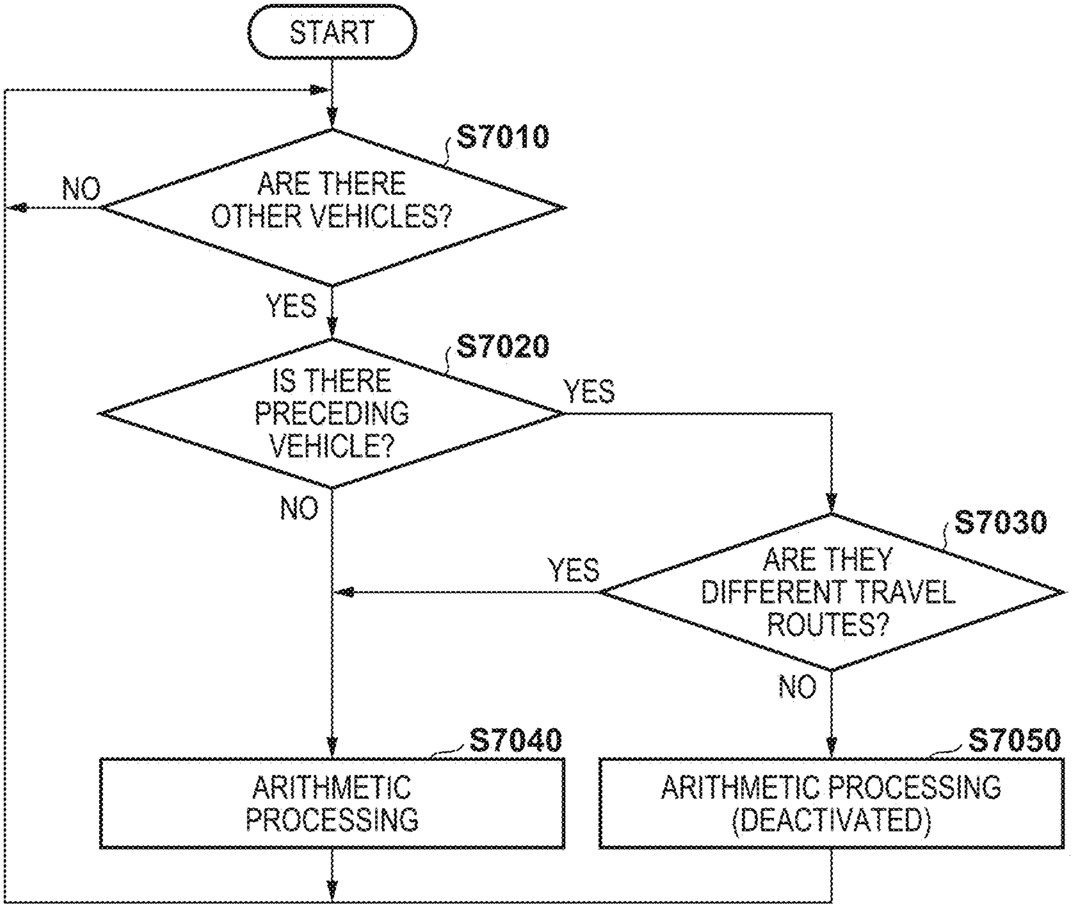
FIG. 7 is a flowchart illustrating control content of the driving assistance device.

FIG. 7 is a flowchart illustrating control content of the driving assistance device 16 when driving assistance is performed according to the present embodiment. This flowchart starts, for example, when the self-vehicle 1 is started and enters a travelable state, and the content of each step can be realized mainly by the CPU 16*a* executing a program.

In step S7010 (hereinafter simply referred to as "S7010": the same applies to other steps described below), it is determined whether there are other vehicles $\mathbf{9}_{OB1}$ and/or $\mathbf{9}_{OB2}$. This determination may be performed based on a communication result of the communication device 14. When presence of other vehicles $\mathbf{9}_{OB1}$ and/or $\mathbf{9}_{OB2}$ is confirmed (when Yes is determined), the process proceeds to S7020. Otherwise (when No is determined), the process returns to S7010.

In S7020, it is determined whether there is the preceding vehicle $\mathbf{9}_{OB3}$. This determination may be performed based on a communication result of the communication device 14. When presence of the preceding vehicle $\mathbf{9}_{OB3}$ is confirmed (when Yes is determined), the process proceeds to S7030. Otherwise, (when No is determined), the process proceeds to S7040.

In S7030, it is determined whether the self-vehicle 1 and the preceding vehicle $\mathbf{9}_{OB3}$ have different travel routes (see FIGS. 6A and 6B). When the self-vehicle 1 and the preceding vehicle $\mathbf{9}_{OB3}$ have different travel routes (when Yes is determined), the process proceeds to S7040. When these travel routes are the same (when No is determined), the process proceeds to S7050.

In S7040 and S7050, arithmetic processing different from each other can be performed.

In the arithmetic processing of S7040, the content described with reference to FIGS. 2A to 3B is performed, and the content mainly includes:

(a) calculating the travel route of other vehicle $\mathbf{9}_{OB1}$ and/or $\mathbf{9}_{OB2}$;

(b) calculating the travel route of self-vehicle 1;

(c) determining whether the self-vehicle 1 interferes with the other vehicle $\mathbf{9}_{OB1}$ and/or $\mathbf{9}_{OB2}$: and (d) generating the sound source signal Sig15*a* and the image signal Sig15*b* as notification signals when it is determined that the self-vehicle 1 interferes with the other vehicle $\mathbf{9}_{OB1}$ and/or $\mathbf{9}_{OB2}$.

In the arithmetic processing of S7050, the content described with reference to FIGS. 4A to 5B is performed, and at least partially omitted or restricted content is performed with respect to the arithmetic processing of S7040. That is, when there is the preceding vehicle $\mathbf{9}_{OB3}$ that has the same travel route as the self-vehicle 1, the arithmetic processing is deactivated, compared with a case where there is no preceding vehicle $\mathbf{9}_{OB3}$.

As an example, in the arithmetic processing of S7050, when it is determined in the above (d) that the self-vehicle 1 interferes with the other vehicle $\mathbf{9}_{OB1}$ and/or $\mathbf{9}_{OB2}$, the image signal Sig15*b* is generated as a notification signal, and the generation of the sound source signal Sig15*a* is inhibited. As another example, when it is determined that the self-vehicle 1 interferes with another vehicle $\mathbf{9}_{OB1}$ and/or $\mathbf{9}_{OB2}$, generation of both the sound source signal Sig15*a* and the image signal Sig15*b* can be inhibited. The deactivation may be performed as long as unnecessary notification by the notification signal is inhibited. As another example, the above (c) may be omitted, and the above (a) and/or (b) may be incidentally further omitted.

As described above, according to the present embodiment, the driving assistance device 16 calculates the travel route of the other vehicle (the oncoming vehicle $\mathbf{9}_{OB1}$ and/or the front crossing vehicle $\mathbf{9}_{OB2}$) based on the communication result with the other vehicle by the communication device 14, and determines whether the self-vehicle 1 interferes with the other vehicle. When it is determined that the self-vehicle 1 interferes with the other vehicle, a predetermined notification signal is generated and output to the notification device 15. Conversely, when there is the preceding vehicle $\mathbf{9}_{OB3}$ having the same travel route in front of the self-vehicle 1, the arithmetic processing including the execution of the determination and the generation of the notification signal is deactivated. Accordingly, driving assistance more comfortable for the driver can be provided without giving unnecessary notification to the driver. Accordingly, according to the present embodiment, it can be said that it is advantageous for improving the preventive safety technology that can be used for driving assistance.

The detection of the preceding vehicle $\mathbf{9}_{OB3}$ may be realized by the self-vehicle 1 communicating with the preceding vehicle $\mathbf{9}_{OB3}$ by the communication device 14, but may alternatively/incidentally be realized by providing a detection device capable of detecting objects around the self-vehicle 1 in the vehicle 1. As the detection device, a camera including a CCD/CMOS image sensor may be used, but a distance measurement device such as a millimeter wave radar or a light detection and ranging (LiDAR) may be used.

The detection device can also detect the other vehicles $\mathbf{9}_{OB1}$ and $\mathbf{9}_{OB2}$. Accordingly, when the vehicle 1 further includes the detection device, the driving assistance device 16 can further perform the driving assistance in combination with the communication device 14. For example, the self-vehicle 1 can communicate with another vehicle outside of the detection range (alternatively, a position that is a blind area of the detection range) of the detection device by the communication device 14. Accordingly, according to the embodiment, it is advantageous for early realization of appropriate driving assistance, diversification of the content of the driving assistance, and provision of more advanced driving assistance.

In the descriptions heretofore, in order to facilitate understanding, each element has been indicated with a functionally related name. However, each element is not limited to an element that has the content described in the embodiments as a main function, and may include the content as a supplementary function. Accordingly, each element may be replaced with a similar expression without being limited by the expression. For the same purpose, the expression “apparatus” may be replaced with “unit”, “component or piece”, “member”, “structure”, “assembly” or the like or may be omitted or attached.

Two or more elements selectively illustrated in the embodiments are not strictly limited to the examples, and may be arbitrarily combined. For example, each of the two or more elements illustrated in the examples may be additionally or alternatively selected. As an example, when two elements A and B are arbitrarily combined, it may be expressed as “A and/or B” or may be expressed as “at least one of A and B” as indicating any of only A, only B, and both A and B.

Conclusion of Embodiment

Some features illustrated in the above embodiments are as follows:

In a first aspect, a driving assistance device (16) mounted on a vehicle (1) capable of communicating with another vehicle ($\mathbf{9}_{OB1}$, $\mathbf{9}_{OB2}$), comprises:

- a calculation unit (16*a*, S7040, (a) thereof) configured to calculate a travel route of the other vehicle based on a result of the communication with the other vehicle; and
- an arithmetic unit (16*a*, S7040, (c) and (d) thereof) configured to determine whether the self-vehicle interferes with the other vehicle traveling on the calculated travel route, and generate a notification signal (Sig15*a*, Sig15*b*) for notifying that the self-vehicle interferes with the other vehicle when it is determined that the self-vehicle interferes with the other vehicle, wherein
- the arithmetic unit is deactivated when a preceding vehicle ($\mathbf{9}_{OB3}$) traveling in a direction equivalent to a direction of the self-vehicle is within a range of a predetermined distance from the self-vehicle (16*a*, S7050).

Accordingly, unnecessary notification is not given to the driver, and it is possible to provide more comfortable driving assistance for the driver which is advantageous for improving the preventive safety technology that can be used for driving assistance.

In a second aspect, when the preceding vehicle is located between the self-vehicle and the other vehicle, the arithmetic unit inhibits generation of the notification signal.

Accordingly, it is possible to inhibit unnecessary notification to the driver.

In a third aspect, the notification signal includes

- a sound source signal (Sig15*a*) for notifying of positional information of the other vehicle by a sound source device, and
- an image signal (Sig15*b*) for giving notification of the positional information of the other vehicle by a display device, wherein,
- when the preceding vehicle is located between the self-vehicle and the other vehicle, the arithmetic unit inhibits its generation of the sound source signal and generates the image signal.

Accordingly, it is possible to give the notification to the driver to the minimum necessary.

In a fourth aspect, the calculation unit further calculates a travel route (Rt) of the self-vehicle based on information indicating a position, a vehicle speed, and a steering angle of the self-vehicle, and

- when the preceding vehicle is located at a reference distance or more from the travel route of the self-vehicle, the arithmetic unit performs the determination and generates the notification signal based on a result of the determination.

Accordingly, when there is an unexpected preceding vehicle, the notification is appropriately given.

In a fifth aspect, the calculation unit further calculates a travel route (Rt) of the preceding vehicle based on a result of the communication with the preceding vehicle and further calculates a travel route of the self-vehicle based on information indicating a position, a vehicle speed, and a steering angle of the self-vehicle, and

- when the travel route of the preceding vehicle is different from the travel route of the self-vehicle, the arithmetic unit performs the determination and generates the notification signal based on a result of the determination.

Accordingly, when there is an unexpected preceding vehicle, the notification is appropriately given.

In a sixth aspect, a driving assistance method for a vehicle capable of communicating with another vehicle, comprises:

- a step of calculating a travel route of the other vehicle based on a result of the communication with the other vehicle; and
- a step of determining whether the self-vehicle interferes with the other vehicle traveling on the calculated travel route, and generating a notification signal for notifying that the self-vehicle interferes with the other vehicle when it is determined that the self-vehicle interferes with the other vehicle, wherein
- when a preceding vehicle traveling in a direction equivalent to a direction of the self-vehicle is within a range of a predetermined distance from the self-vehicle, the determination is performed and the generating of the notification signal is deactivated.

Accordingly, the same effect as the first aspect can be obtained.

In a seventh aspect, a computer-readable storage medium stores a program causing a computer to execute driving assistance for a vehicle capable of communicating with another vehicle, the program causing the computer to perform:

- calculating a travel route of the other vehicle based on a result of the communication with the other vehicle; and
- determining whether the self-vehicle interferes with the other vehicle traveling on the calculated travel route, and generating a notification signal for notifying that the self-vehicle interferes with the other vehicle when it is determined that the self-vehicle interferes with the other vehicle, wherein,
- when a preceding vehicle traveling in a direction equivalent to a direction of the self-vehicle is within a range of a predetermined distance from the self-vehicle, the determination is performed and the generating of the notification signal is deactivated.

Accordingly, the same effect as the first aspect can be obtained. The program may be stored in a computer-readable storage medium.

The invention is not limited to the foregoing embodiments, and various variations/changes are possible within the spirit of the invention.

What is claimed is:

1. A driving assistance device mounted on a vehicle capable of communicating with another vehicle, the driving assistance device comprising at least one processor circuit with a memory comprising instructions that, when executed by the processor circuit, cause the at least one processor circuit to at least:

calculate a travel route of the other vehicle based on a result of the communication with the other vehicle; and determine whether the self-vehicle interferes with the other vehicle traveling on the calculated travel route, and generate a notification signal for notifying that the self-vehicle interferes with the other vehicle when it is determined that the self-vehicle interferes with the other vehicle, wherein wherein the determination that the self-vehicle interferes with the other vehicle and the generation of the notification signal deactivated both (a) when a preceding vehicle traveling in a direction equivalent to a direction of the self-vehicle is within a range of a predetermined distance from the self-vehicle, and (b) when a vehicle body reference line (L9) of the preceding vehicle overlaps or intersects the travel route of the self-vehicle, and/or when the vehicle body reference line is within a range of a reference length ($L_{REF}$) from the travel route of the self-vehicle, the vehicle body reference line corresponding to a center line of the preceding vehicle.

2. The driving assistance device according to claim 1, wherein, when the preceding vehicle is located between the self-vehicle and the other vehicle, the generation of the notification signal is inhibited.

3. The driving assistance device according to claim 2, wherein the notification signal includes a sound source signal for notifying of positional information of the other vehicle by a sound source device, and an image signal for giving notification of the positional information of the other vehicle by a display device.

4. The driving assistance device according to claim 1, wherein a travel route of the self-vehicle is calculated based on information indicating a position, a vehicle speed, and a steering angle of the self-vehicle.

5. The driving assistance device according to claim 1, wherein a travel route of the preceding vehicle is calculated based on a result of the communication with the preceding vehicle and a travel route of the self-vehicle is calculated based on information indicating a position, a vehicle speed, and a steering angle of the self-vehicle.

6. A driving assistance method for a vehicle capable of communicating with another vehicle, the method comprising:

a step of calculating a travel route of the other vehicle based on a result of the communication with the other vehicle; and a step of determining whether the self-vehicle interferes with the other vehicle traveling on the calculated travel route, and generating a notification signal for notifying that the self-vehicle interferes with the other vehicle when it is determined that the self-vehicle interferes with the other vehicle, wherein both (a) when a preceding vehicle traveling in a direction equivalent to a direction of the self-vehicle is within a range of a predetermined distance from the self-vehicle, and (b) when a vehicle body reference line (L9) of the preceding vehicle overlaps or intersects the travel route of the self-vehicle, and/or when the vehicle body reference line is within a range of a reference length ($L_{REF}$) from the travel route of the self-vehicle, the vehicle body reference line corresponding to a center line of the preceding vehicle, the determination is performed and the generating of the notification signal is deactivated.

7. A computer-readable storage medium non-transitory storing a program causing a computer to execute driving assistance for a vehicle capable of communicating with another vehicle, the program causing the computer to perform:

calculating a travel route of the other vehicle based on a result of the communication with the other vehicle; and determining whether the self-vehicle interferes with the other vehicle traveling on the calculated travel route, and generating a notification signal for notifying that the self-vehicle interferes with the other vehicle when it is determined that the self-vehicle interferes with the other vehicle, wherein both (a) when a preceding vehicle traveling in a direction equivalent to a direction of the self-vehicle is within a range of a predetermined distance from the self-vehicle, and (b) when a vehicle body reference line (L9) of the preceding vehicle overlaps or intersects the travel route of the self-vehicle, and/or when the vehicle body reference line is within a range of a reference length ($L_{REF}$) from the travel route of the self-vehicle, the vehicle body reference line corresponding to a center line of the preceding vehicle, the determination is performed and the generating of the notification signal is deactivated.

* * * * *